CIRCUIT ARRANGEMENT FOR CORRECTING A TELEVISION SIGNAL

Filed March 2, 1967 2 Sheets-Sheet 1

INVENTOR.
EDMOND DE NIET
BY
[signature]
AGENT

CIRCUIT ARRANGEMENT FOR CORRECTING A TELEVISION SIGNAL

INVENTOR.
EDMOND DE NIET
BY
AGENT

United States Patent Office 3,521,177

Patented July 21, 1970

3,521,177
CIRCUIT ARRANGEMENT FOR CORRECTING A TELEVISION SIGNAL

Edmond deNiet, Emmasingel, Eindhoven, Netherlands, assignor, by mesne assignments, to U.S. Philips Corporation, New York, N.Y., a corporation of Delaware Filed Mar. 2, 1967, Ser. No. 620,046
Claims priority, application Netherlands, Mar. 2, 1966, 6602675
Int. Cl. H03b *1/100*
U.S. Cl. 328—162 8 Claims

ABSTRACT OF THE DISCLOSURE

In a known system for reproducing a recorded television signal, a filter is employed to emphasize low frequency signals which were attenuated during recording, and a clamp circuit is provided to restore the direct current level. According to the inveniton, an improved signal-to-noise level is obtained by employing a positive frequency dependent feedback network between the output and input of the clamp circuit. A filter having different frequency characteristics than the input filter of the prior systems may also be provided.

Figures 1, 2A, 2B:
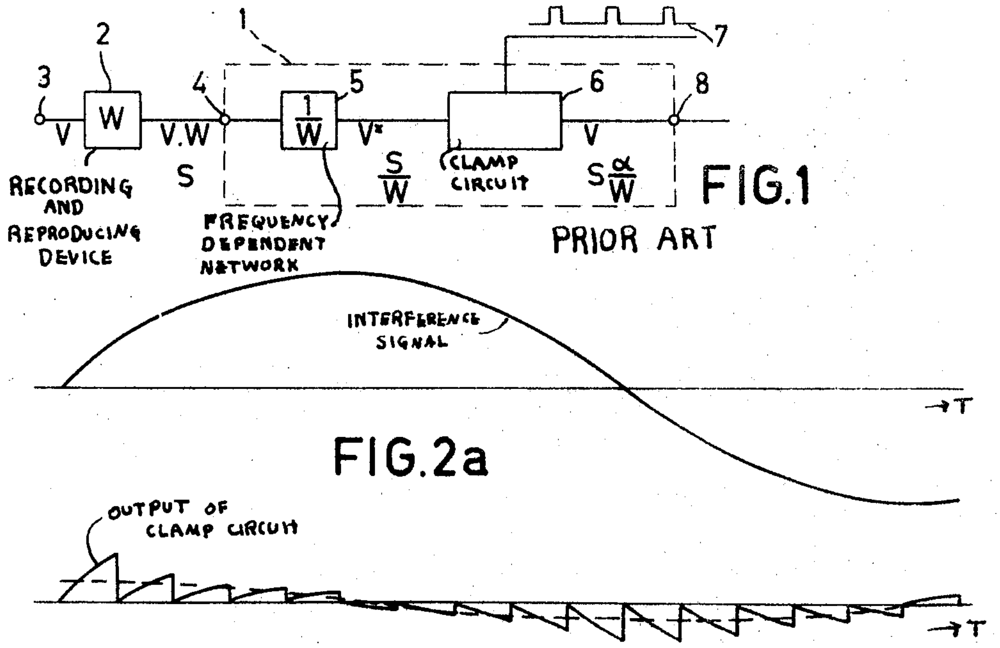

A circuit arrangement for correcting a television signal which comprises alternately video-signal portions and periodically occurring reference signal portions, said signal being applied to the circuit arrangement through a transmission channel comprising first frequency-dependent transmission means attenuating the lower signal frequencies and eliminating the D.C. component of the signal, the arrangement comprising a clamp circuit, controlled by clamping pulses during the reference signal portions, for restoring the D.C. component of the signal and second frequency-dependent transmission means for compensating the attenuation of the lower signal-frequencies brought about by said first frequency-dependent transmission means.

Such circuit arrangements are frequently used in television technology for reintroducing the direct voltage component of the signal and for correcting the frequency characteristic, for example, in devices for recording and reproducing a television signal.

It is known that in recording and reproducing a television signal an attenuation occurs which depends upon the frequency which is larger according as the frequency is lower and that in particular the direct voltage component of the signal which forms an essential part of the television information is entirely lost.

Known circuit arrangements for correcting television signal comprise a frequency-dependent amplifier to which the signal is applied and in which the low frequencies are emphasized again. The output signal of the said amplifier is then applied to a clamp circuit with which the lost direct voltage component is added again.

An important problem which occurs in general in devices for handling television signals and in particular in devices for recording and reproducing television signals is the improvement of the signal-to-noise ratio. Since the low frequency noise signals or interference signals exert a great interfering influence on the reproduced scene, particularly the improvement of the low-frequency signal-to-noise ratio is of great importance.

It is the object of the invention to provide a circuit arrangement with which this low-frequency signal-to-noise ratio can be improved to a considerably larger extent than in the known circuit arrangements and the circuit arrangement according to the invention is characterized in that the said second frequency-dependent transmission means are connected in a feedback path to which the output-signal of the clamp circuit is applied, the signal from the feedback path together with the signal from the transmission channel being applied to the clamp circuit with such a polarity that the feedback coupling occurring through the feedback path is positive.

In the circuit arrangement according to the invention the fact is used that a clamp circuit in itself produces an attentuation of the low-frequency interference signals without the low frequencies of the television signal being attenuated and the invention is based on the recognition of the fact that when the low signal frequencies and the low interfering frequencies are first attenuated and then the low signal frequencies are emphasized again by means of a signal derived from the output circuit of the clamp circuit, said low signal frequencies are emphasized without the low frequency interference signals being also emphasized.

The invention will be described in greater detail, with reference to the figures shown in the drawings, in which—

FIG. 1 is the principal circuit diagram of a known circuit arrangement.

FIGS. 2*a* and 2*b* serve for explaining the operation of the circuit arrangement according to the invention.

Figure 3:
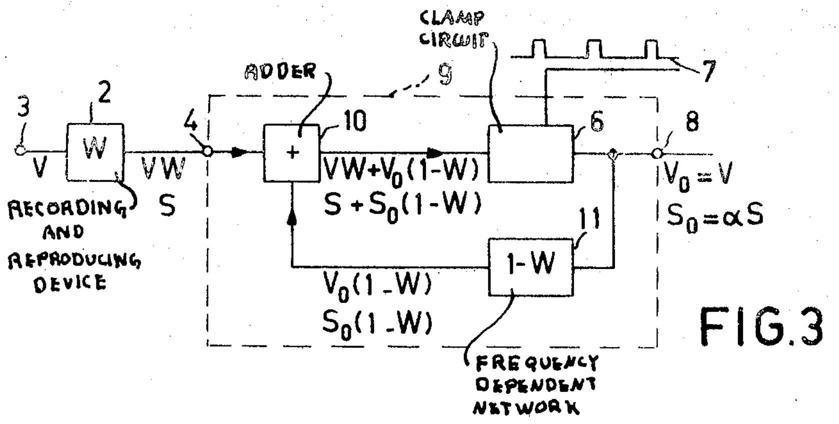
Figure 4:
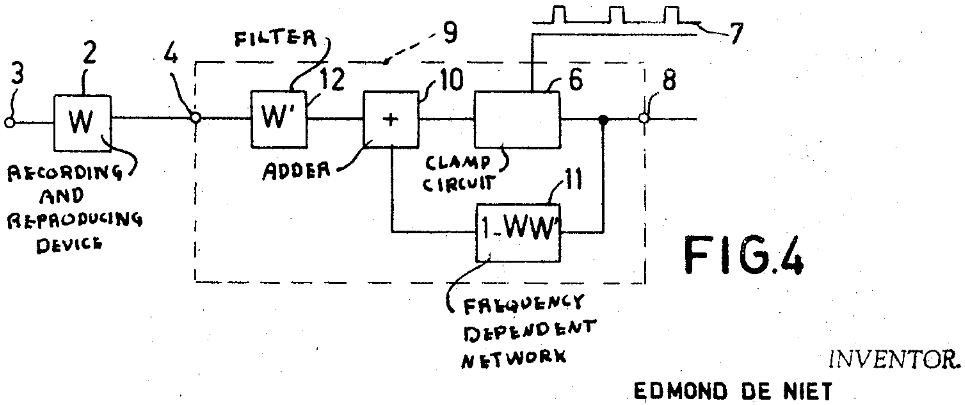
Figure 5:
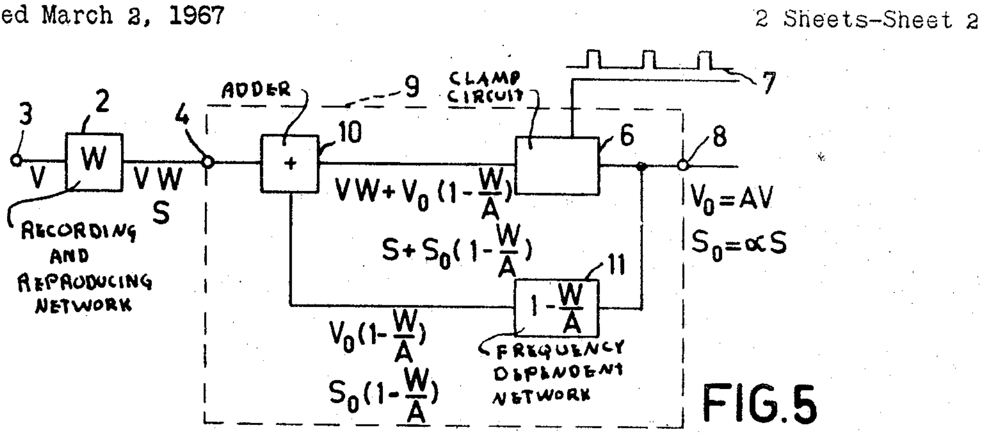

FIGS. 3, 4 and 5 are principal circuit diagrams of several embodiments of circuit arrangements according to the invention.

Figure 6A:
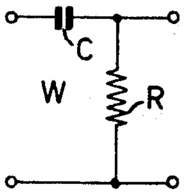
Figure 6B:
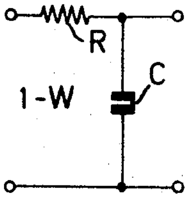
Figure 6C:
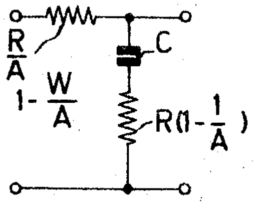
Figure 7:
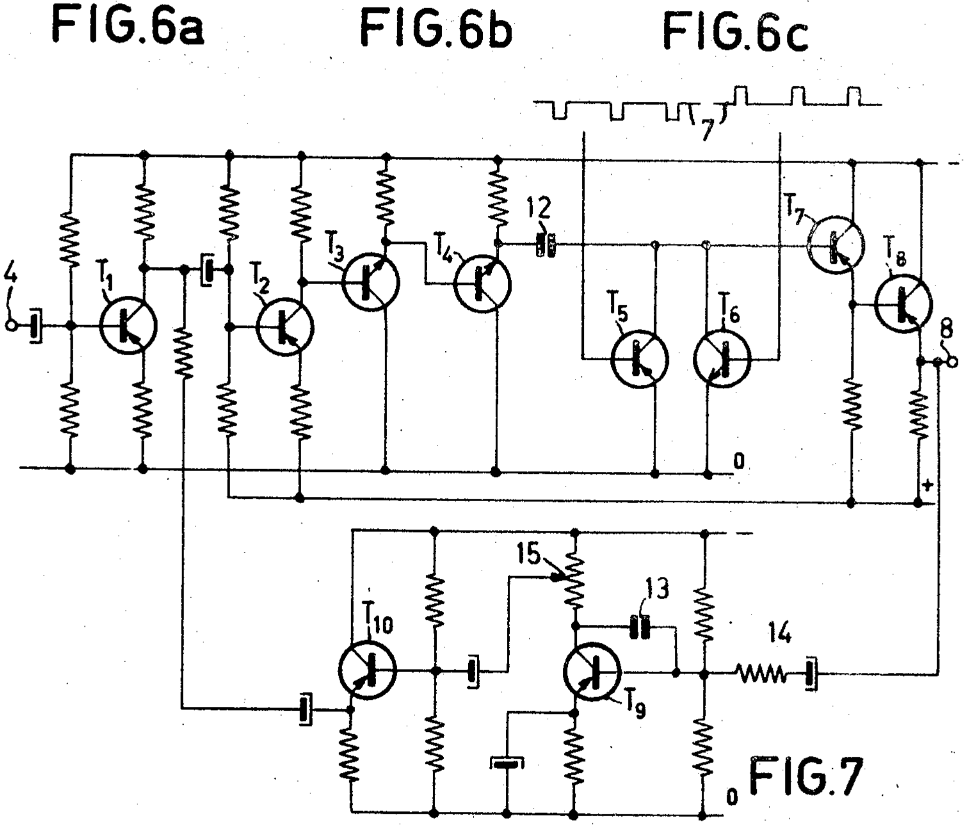

FIGS. 6*a*, 6*b* and 6*c* show filter networks for use in a circuit arrangement according to the invention, and FIG. 7 shows in greater detail an embodiment of a circuit arrangement according to the invention.

Referring now to FIG. 1, reference numeral 1 denotes a known circuit arrangement for correcting a television signal originating from a device for magnetically recording and reproducing said signal. In FIG. 1 this device for the magnetic recording and reproducing is diagrammatically denoted by the unit 2. During the recording process the television signal V to be recorded is applied to the input 3 of said device and the recorded signal is derived from the output 4 of said device during the reproduction process. Since the recording and reproducing device is not capable of transmitting the direct voltage component of the signal and also attenuates the low signal frequency, the device 2 has a frequency-dependent transmission function; in FIG. 1 this function is denoted by W. Therefore a distorted television signal which may be represented by V.W. is available at the output 4 of the recording and reproducing device 2.

In the known circuit arrangement shown in FIG. 1, this distorted television signal is applied to a frequency-dependent network 5, in particular a frequency-dependent amplifier, having a transmission function which mainly compensates for the frequency dependence of the device 2 and which network 5 therefore has the transmission function $1/W$. Thus the ouput signals of the network 5 is equal to $V.W.1/W.=V^*$, the symbol (*) denoting that the signal V* substantially conforms to the signal V applied to the device 2 during the recording process but lacks the direct voltage component hereof. This direct voltage component which in fact is fully lost in the recording and reproducing process can therefore not be regained by the network 5.

For reintroducing this direct voltage component the signal V* is applied to a clamp circuit 6. The television signal contains in addition to the video signal-portion also periodically occurring reference signal-portions, for example, the synchronisation pulses or the front or back porches of the synchronization pulses. These reference signal-portions are set up at a reference potential by means of clamping pulses 7 occurring synchronously with the reference signal-portions and likewise applied to the clamp circuit 6. As a result of this the direct voltage component of the television signal is restored in known manner so that the signal V occurring at the output 8 of the clamp circuit 6, substantially conforms to the signal originally applied to the input 3.

The signal V which is applied during the recording process to the recording and reproducing device 2 may be subject to interference signals which have no relationship with tht signal V and which in general are referred to as noise. Noise may also be produced in the recording and reproducing process, while also the reproducing amplifier which amplifies the reproduced signals and which is supposed to be present in the device 2 produces noise signals. All this noise is denoted in FIG. 1, by the symbol S at the output 4 of the recording and reproducing device 2 and, assuming the network 5 to produce itself no or substantially no noise, the noise signal produced by the network 5 and applied to the clamp circuit 6 therefore is equal to $S/W$.

In order to denote the influence of the clamp circuit on this interference signal, FIG. 2*a* shows a sinusoidal interference signal having the frequency $f_S$ which is applied to the clamp circuit 6. Since this interference signal has no relationship with the television signal and with the clamping pulses 7, the television signal also presents at the input of the clamp circuit may be left out of consideration. The interference signal is periodically clamped at the value zero by the clamping pulses 7 the clamping frequency $f_c$ of which is assumed to be large with respect to $f_S$, so that at the output 8 of the clamp circut an interference signal occurs as shown in FIG. 2*b*. The low-frequency component hereof is denoted in broken lines in FIG. 2*b*.

From FIGS. 2*a* and 2*b* it appears that the low-frequency noise component is attenuated by the clamp circuit while also a phase shift of 90° occurs. It may be derived that the transmission function $\alpha$ of a clamp circuit, at least when the frequency of the interferences signal $f_S$, is low with respecst to the clamping frequency $f_c$, is substantially equal to $$\alpha = j\pi \frac{f_S}{f_c}$$

wherein the operator $j$ is the 90° phase shift. Noise signals the frequencies of which are large with respect to the clamping frequency are transmitted uninfluenced by the clamp circuit; it therefore holds for $f_S \gg f_c$ that $\alpha = 1$.

For the circuit arrangement shown in FIG. 1, in which an interference signal $S/W$ is applied to the clamp circuit the intereference signal occurring at the output 8 may therefore be represented by $$S\frac{\alpha}{W}$$

FIG. 3 shows a circuit arrangement with which a considerably improved low-frequency signal-to-noise ratio is obtained. This figure shows, in the same manner as FIG. 1, a recording and reproducing device 2 having an input 3 and an output 4, the transmission function of the said device being denoted by W. The distorted output signal V.W. of the recording and reproducing device is applied to a correction circuit 9 which comprises an adder 10, a clamp circuit 6 and a frequency-dependent network 11. The transmission function of the network 11 is substantially chosen to be equal to $1-W$. In the adder 10 the signal V.W. is added to the output signal of the network 11 and the signal supplied by this adder is clamped in the clamp circuit 6 by means of the clamping pulses 7. The output signal $V_0$ which may be derived from the output 8 of the clamp circuit is also applied to the input of the frequency-dependent network 11.

It may be seen in a simple manner that in this circuit the signal distortion which is produced by the device 2 is fully corrected.

If the signal at the output terminal 8 is denoted by $V_0$, the signal supplied by the network 11 is $V_0(1-W)$. In the adder 10 this signal is added to the input signal V.W. of the device 9 so that the signal $V.W.+V_0.(1-W)$ is applied to the clamp circuit. Assuming preliminarily that the clamp circuit 6 is not present it therefore holds that $V_0=V.W.+V_0(1-W)$ from which it follows that $V_0=V$, so that the television signal at the output 8 conforms to the signal originally applied to the device 2. Of course the clamp circuit 6 should be present in the circuit arrangement to prevent that the circuit becomes unstable for very low frequencies. Since in fact the device 2 is not capable of transmitting the very low frequency and particularly the direct voltage component of the television signal, it holds for these low frequencies that $W=0$; the transmission function of the network 11 therefore is equal to 1 for these low frequencies, so that also the loop gain of the circuit arrangement is equal to 1. The clamp circuit 6 serves for preventing the occurence of oscillations in a very slow rhythm.

If in a corresponding manner as shown in FIG. 1 it is assumed that at the input 4 of the correction circuit an interference signal S occurs, while the interference signal caused thereby at the output 8 is $S_0$, the value of $S_0$ can be determined as follows.

The interference signal which occurs at the output of the network 11 is equal to $S_0(1-W)$. In the adder 10 this is added to the interference signal S from the input 4 so that an interference signal $S+S_0(1-W)$ is applied to the clamp circuit. Since, as demonstrated above, the transmission function of the clamp circuit for noise signals may be represented by $\alpha$ it holds for the interference signal $S_0$ at the output 8 that: $S_0=\alpha\{S+S_0(1-W)\}$ from which it follows after elaboration that:

$$S_0 = \frac{\alpha S}{1-\alpha(1-W)}$$

For the low-frequency interferences it holds that $W \ll 1$ and $\alpha \ll 1$, with which the above expression becomes $S_0=\alpha S$.

A comparison of the circuit arrangements shown in FIGS. 1 and 3 proves that with the same signal-to-noise ratio $VW/S$ at the input 4, the signal-to-noise ratio at the output 8 in the circuit arrangement shown in FIG. 1 is equal to $$\frac{V}{S\alpha/W} = \frac{VW}{S\alpha}$$

while the low-frequency signal-to-noise ratio at the output 8 in the circuit arrangement shown in FIG. 3 is equal to $V/\alpha S$. So the improvement of the signal-to-noise ratio in the circuit arrangement shown in FIG. 1, is equal to $$\frac{\frac{VW}{S\alpha}}{\frac{VW}{S}} = \frac{1}{\alpha}$$

and the improvement of the signal-to-noise ratio in the circuit arrangement shown in FIG. 3 is $$\frac{\frac{V}{S\alpha}}{\frac{VW}{S}} = \frac{1}{\alpha W}$$

Since the transmission function W for low frequencies is small with respect to 1, this improvement is very considerable for low frequencies.

It is to be noted that a further advantage of the circuit arrangement according to the invention is that the compensating network 11 with the transmission function $1-W$ usually has a simpler composition than the compensating network 5 with transmission function $1/W$ in the known circuit arrangement shown in FIG. 1.

As was demonstrated above, the improvement of the low-frequency signal-to-noise ratio is larger according as the transmission function W is smaller, that is to say, according as the attenuation for the low frequencies of the input signal is larger. This means that an additional improvement of the low-frequency signal-to-noise ratio can be achieved if an additional filter network is included in the input channel of the circuit arrangement. The network 11 is varied so that also the influence of this additional filter network on the television signal is compensated for.

If, for example, the cut-off frequency of the recording and reproducing device 2 is approximately 300 c./s. and if a considerable disturbing influence is experienced from noise signals in the frequency range between 300 c./s. and 2000 c./s., this disturbing influence may be considerably reduced by including in the input channel of the circuit arrangement an additional filter attenuating the frequencies lower than 2000 c./s. and having the transmission function W' (see FIG. 4). The influence of this filter on the television signal may be compensated for by choosing the transmission function of the network 11 to be proportional to $(1-WW')$.

It is to be noted that the transmission function W of a device for recording and reproducing television signals may have such a shape that it is objectionable to construct a compensating electric network 11 with the transmission function $1-W$ and $1-WW'$, respectively. The network 11 in FIG. 3 may then be formed advantageously by a simpler electric network the transmission function of which is at least approximately equal to $1-W$. In the circuit arrangement shown in FIG. 4, in which an additional filter 12 of a simple electric structure is incorporated, it will in many cases be sufficient advantageously to choose the transmission function of the network 11 to be equal to approximately $1-W'$ instead of equal to $1-WW'$. The compensation of the signal distortion produced by the device 2 is then effected by the clamp circuit 6.

A further method of improving the low-frequency signal-to-noise ratio is shown in FIG. 5. This circuit arrangement is fully identical to that of FIG. 3 with the exception that the network 11 has a transmission function which is equal to $$1-\frac{W}{A}$$

instead of the transmission function $1-W$, wherein A is a constant which exceeds 1. In a manner analogous to that described with reference to FIG. 3 it can be demonstrated that it holds for the television output signal $V_0$ that: $V_0=AV$, while for the interference signal $S_0$ at the output 8 it holds that $$S_0=\frac{\alpha S}{1-\alpha\left(1-\frac{W}{A}\right)}$$

which expression becomes $S_0=\alpha S$ for low frequencies for which it holds that $\alpha \ll 1$ and $W \ll 1$. From these results it follows that as a result of the factor A the circuit has an inherent amplification A for the television signal while no amplification for the low frequencies of the interference signal occurs. The signal-to-noise ratio is therefore improved by a factor A by said measure, at least inasfar as the low frequencies are concerned. It is to be noted that the factor A may not be chosen to be too large since otherwise unstability phenomena for the higher frequencies occur which cannot be suppressed by the clamp circuit 6. It will be clear that in an analogous manner in the circuit arrangement shown in FIG. 4 an improvement of the low-frequency signal-to-noise ratio can be obtained by choosing the transmission function of the network 11 in this figure to be equal to $$1-\frac{WW'}{A}$$

For illustration it is to be noted that if the device 2 consists of, or if the transmission function V of this device may be imitated by an RC-network comprising a series capacitor C and a parallel resistor R (see FIG. 6*a*) the network 11 with transmission function $1-W$ may consist of an RC-network having a series resistor R and a parallel capacitor C (see FIG. 6*b*). A network with transmission function $$1-\frac{W}{A}$$

may then consist of a series resistor $R/A$ and a parallel branch comprising the series arrangement of a capacitor C and a resistor $$R\left(1-\frac{1}{A}\right)$$

(see FIG. 6*c*).

FIG. 7 shows in greater detail an elaborate embodiment of a circuit arrangement according to the invention. To the input terminal 4 of this circuit is applied the television signal which originates, for example, from a device for the magnetic recording of said signal. The signal is applied to an amplifier stage comprising a transistor $T_1$ which stage also serves as an adder for adding the correction signal from a transistor $T_{10}$. The signal supplied by the adder is applied, through a second amplifier stage having a transistor $T_2$ and through a buffer stage comprising two transistors $T_3$ and $T_4$ connected as emitter followers, to a clamp circuit. The clamp circuit comprises a series capacitor 12 and two switching transistors $T_5$ and $T_6$ of opposite conductivity types to the bases of which periodically occurring clamping pulses 7 are applied which periodically open the transistors $T_5$ and $T_6$. If during the occurrence of the clamping pulses the signal level at the collector electrodes of the transistors $T_5$ and $T_6$ is negative with respect to the reference level (the zero potential applied to the emitter electrodes of the transistors $T_5$ and $T_6$), the transistor $T_5$ is opened so that the collector potential is brought at the reference level; on the other hand when the collector potential during the occurrence of the clamping pulses is positive with respect to the reference level, the transistor $T_6$ is opened so that also the collector potential is brought at the reference level.

The output signal of the clamp circuit is applied to the output terminal 8 through a buffer stage comprising two transistors $T_7$ and $T_8$ connected as emitter followers, and is also applied to the frequency-dependent network with the transmission function 1—W (compare FIG. 3). This frequency-dependent network is formed by a Miller integrator which comprises a transistor $T_9$, a capacitor 13 incorporated between the base electrode and the collector electrode of said transistor, a resistor 14 present in the base supply line, and a collector resistor $R_{15}$. The product of $C_{13}$ and $R_{15}$ determines the time constant of the network. The output signal of the Miller integrator is applied, through a buffer stage and a transistor $T_{10}$, to the adder of which the transistor $T_1$ forms part. The collector resistor 15 of the transistor $T_9$ is constructed as a potentiometer with which the loop gain of the circuit arrangement is set at the correct value.

Although the invention has been described for use in combination with a recording and reproducing device, it will be clear that the invention is not restricted to such an application. The invention may be used generally in those cases in which the direct voltage component of a television signal must be introduced and in which also the low frequencies of the signal must be emphasized. Alternatively the invention may be used to improve the low-frequency signal-to-noise ratio of a television signal which in itself is undistorted but in which the low-frequency signal-to-noise ratio is too small (as is the case, for example, with a television signal originating from a camera tube), by first passing the signal through a filter attenuating the low frequency and then emphasizing these in the manner described according to the invention.

What is claimed is:

1. A distortion correction circuit comprising means for adding having two input and one output terminal, a first of said input terminals comprising means for receiving an input signal having periodic reference signal portions and frequency dependent distortion in acocrdance with a frequency dependent distortio factor W; means for clamping portions of the entire output signal potential of said adding means to a selected potential value during the occurrence of said reference signal portions, said clamping means having an input coupled to said output of said adding means and an output; and means for positively feeding back the output signal of said clamping means to said second input of said adding meas in accordance with the frequency dependent distortion of said input signal and with a loop gain of less than one.

2. A circuit as defined in claim 1 wherein said positive feedback means has the transfer function $1-W$.

3. A circuit as defined in claim 1 further comprising a filter having the frequency transfer function $W^1$ coupled to said first input terminal of said adding means and wherein said feedback means has the transfer function $1-WW^1$.

4. A circuit as defined in claim 1 wherein said clamping means has the transfer function A, wherein A is a constant greater than 1, and wherein said feedback means has the transfer function $$1-\frac{W}{A}$$

5. A circuit as defined by claim 1 wherein said feedback means includes a series resistor and a parallel capacitor circuit.

6. A circuit as defined in claim 1 wherein said feedback means includes a first series resistor and a parallel circuit comprising a second resistor and a capacitor in series with said second resistor.

7. A circuit as defined in claim 1 wherein said feedback means includes a Miller integrator.

8. A circuit as defined in claim 1 wherein said clamping means includes two transistors of opposite conductivity type, each having emitter, base and collector electrodes, said emitter and collector electrodes coupled together, respectively, said base electrodes coupled to sources of opposite polarity pulses synchronized with said reference signal portions.

References Cited

UNITED STATES PATENTS

| | | |
|---|---|---|
| 2,843,662 | 7/1958 | Rieke. |
| 3,315,033 | 4/1967 | Sennhenn et al. |
| 3,324,405 | 6/1967 | Corney. |

ROBERT L. GRIFFIN, Primary Examiner

A. H. EDDLEMAN, Assistant Examiner

U.S. Cl. X.R.

178—7.1, 7.3; 307—237